(12) United States Patent
Nitta et al.

(10) Patent No.: US 6,885,547 B2
(45) Date of Patent: Apr. 26, 2005

(54) ELECTROLYTIC CAPACITOR

(75) Inventors: Yukihiro Nitta, Kyoto (JP); Hiroki Kusayanagi, Kyoto (JP); Hiroyuki Matsuura, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/813,332

(22) Filed: Mar. 30, 2004

(65) Prior Publication Data

US 2004/0223270 A1 Nov. 11, 2004

(30) Foreign Application Priority Data

Mar. 31, 2003 (JP) ........................................ 2003-094938

(51) Int. Cl.⁷ ............................................... H01G 9/02
(52) U.S. Cl. ....................... 361/512; 361/511; 361/530
(58) Field of Search ................................ 361/511, 512, 361/523, 530, 525

(56) References Cited

U.S. PATENT DOCUMENTS

| | | | |
|---|---|---|---|
| 6,229,689 B1 * | 5/2001 | Kobayashi et al. | 361/525 |
| 6,288,889 B1 * | 9/2001 | Komatsu et al. | 361/511 |
| 6,381,121 B1 * | 4/2002 | Monden et al. | 361/525 |
| 6,430,032 B1 * | 8/2002 | Sakai et al. | 361/523 |
| 6,430,033 B1 * | 8/2002 | Mitsui et al. | 361/525 |

FOREIGN PATENT DOCUMENTS

| JP | 64-90517 | 4/1989 |
|---|---|---|
| JP | 7-249543 | 9/1995 |
| JP | 11-186110 | 7/1999 |

* cited by examiner

*Primary Examiner*—Anthony Dinkins
(74) *Attorney, Agent, or Firm*—Pearne & Gordon LLP

(57) ABSTRACT

A dielectric oxide film-having anode foil and a cathode foil put opposite to each other via a separator therebetween are coiled up to construct a capacitor device. In this, the separator is coated with an electroconductive polymer formed through chemical oxidation polymerization of a polymerizing monomer in a solution that contains at least a non-transition metal-based oxidizing agent and an organic acid compound. Even when the electrolytic capacitor with the capacitor device is driven in a high-humidity atmosphere and a large amount of water penetrates into it, the capacitor is free from a trouble of dedoping, and therefore keeps its high voltage-proofness and leak current stability. The electrolytic capacitor is resistant to heat and its ESR is low in a high-frequency region.

5 Claims, 1 Drawing Sheet

ELECTROLYTIC CAPACITOR

BACKGROUND OF THE INVENTION

1. Field of the Invention

The present invention relates to a coil-form electrolytic capacitor that is used in various electronic appliances.

2. Description of the Related Art

With the recent tendency toward popularization of high-frequency electronic appliances, high-performance electrolytic capacitors are needed that have a reduced equivalent series resistance (ERS) in a high-frequency region for the parts of such electronic appliances. For reducing their ERS in a high-frequency region, solid electrolytic capacitors are investigated these days that comprise a solid electrolyte such as an electroconductive polymer having a high electric conductivity. To satisfy the requirement for increasing their capacity, solid electrolytic capacitors are being put on the market that are constructed by coiling up an anode foil and a cathode foil with a separator sandwiched therebetween followed by infiltrating an electroconductive polymer into the thus-constructed coil-form capacitor device.

In the coil-form electrolytic capacitor, a separator is an indispensable element to be between the anode foil and the cathode foil for preventing them from being in contact with each other. For the separator, for example, employed is ordinary electrolytic paper formed of Manila hemp or kraft paper as in ordinary electrolytic capacitors that contain an ordinary driving electrolytic solution as the electrolyte therein. The coiled capacitor device having such electrolytic paper for separator is heated so as to carbonize the electrolytic paper (thus carbonized, the paper is hereinafter referred to as carbonized paper). Apart from it, a nonwoven fabric of glass fibers or a nonwoven fabric of synthetic fibers such as vinyl on, polyester or polyamide may also be used for the main ingredient of the separator.

For the electroconductive polymer to be used for the solid electrolyte, known is poly-3,4-ethylenedioxy-thiophene prepared through chemical oxidation polymerization of a cationic component and an anionic component where the cationic component functions as an oxidizing agent owing to the reduction of the metal ion and the anionic component serves as a dopant and therefore functions both as an oxidizing agent and a dopant, such as typically polymerization of 3,4-ethylenedioxy-thiophene with ferric p-toluenesulfonate. Also known for it is polypyrrole prepared through chemical oxidation polymerization of a monomer pyrrole with ferric chloride or persulfate that serves as an oxidizing agent and also as a dopant.

On the other hand, coil-form electrolytic capacitors are also proposed, in which both a solid electrolyte of electroconductive polymer and a driving electrolytic solution are used for the material of cathode lead.

The coil-form electrolytic capacitors of the type proposed include, for example, the following: A separator formed of Manila paper or kraft paper, or a separator formed of a porous film or a nonwoven fabric of synthetic fibers is processed with an electroconductive polymer that is prepared through chemical oxidation polymerization with a persulfate serving both as an oxidizing agent and as a dopant, whereby the separator is made electroconductive, and the resulting electroconductive separator is used along with a driving electrolytic solution to construct an electrolytic capacitor (for example, JP-A-1-1090517 and JP-A 7-249543). A coil-type capacitor device is infiltrated with an electroconductive polymer and a driving electrolytic solution to construct an electrolytic capacitor (for example, JP-A 11-186110).

In the above-mentioned coil-form solid electrolytic capacitor, however, a solid electrolyte of an electroconductive polymer or the like that could poorly repair dielectric oxide film is used. Therefore, it is difficult to construct voltage-proof capacitors, and only capacitors having a rated voltage of at most 25 to 32 V or so could be obtained.

Even within the rated voltage range, the capacitors may have a trouble of short circuit owing to unexpected increase in leak current during their use or owing to the formation of defects in the dielectric oxide film, and therefore the capacitors must be used after their trouble rate is explicitly computed. However, this is troublesome in using the capacitors.

In addition, during the process of producing the solid electrolytic capacitors, they may frequently have a trouble of short circuit during aging, and the percent defective in their production is extremely high as compared with that in producing electrolytic capacitors that comprise a driving electrolytic solution. This is another problem with the solid electrolytic capacitors.

The trouble of short circuit could be overcome in some degree by using a high-density separator or a heat-resistant separator (e.g., separators consisting essentially of polyester resin or aramid resin), but the coil-form solid electrolytic capacitors are still unsatisfactory in this respect, as compared with conventional electrolytic capacitors that comprise a driving electrolytic solution alone.

For overcoming the trouble, electrolytic capacitors are proposed in which both a solid electrolyte of electroconductive polymer and a driving electrolytic solution are used for the material of cathode lead. In these, however, since the solid electrolyte is formed of an electroconductive polymer prepared through chemical oxidation polymerization with an inorganic acid salt, persulfate such as sodium persulfate or ammonium persulfate that serves both as an oxidizing agent and as a dopant, the persulfate ion that functions as the dopant is readily dedoped to dissolve out in the driving electrolytic solution, and the electroconductivity of the electroconductive polymer is significantly lowered owing to the dedoping. Therefore, the solid electrolyte has some problems in that its thermal stability in electrolytic capacitors is poor and its ESR greatly varies with time in a high-frequency region.

A method for producing a solid electrolytic capacitor is known, which comprises chemical oxidation polymerization of 3,4-ethylenedioxy-thiophene with a hardly-dedopable transition metal-based oxidizing agent such as ferric p-toluenesulfonate that has the ability to assist oxidation-reduction of metal ion and serves also as a dopant. When the capacitor device having the constitution is infiltrated with a driving electrolytic solution to construct an electrolytic capacitor, then the remaining metal ion component may dissolve out and deposit in the driving electrolytic solution owing to the electrochemical reaction thereof in the solution, and, as a result, the leak current from the electrolytic capacitor may increase. This is one problem with the electrolytic capacitor of the type. Even when the solid electrolytic capacitor is constructed not infiltrated with a driving electrolytic solution, it could not still solve the problem. This is because, when the solid electrolytic capacitor is used in a high-humidity atmosphere, then the remaining metal ion component will also dissolve out and deposit in it owing to the electrochemical reaction of the metal ion in water that may penetrate into it through the sealed opening of the capacitor and, as a result, the leak current from the capacitor may also increase.

SUMMARY OF THE INVENTION

An object of the invention is to solve these problems with the related art, and to provide a low-ESR electrolytic capacitor that has the advantages of high voltage-proofness and good stability in leak current.

To solve the above-mentioned problems, the invention is an electrolytic capacitor with a capacitor device constructed by coiling up a dielectric oxide film-having anode foil and a cathode foil put opposite to each other via a separator coated with an electroconductive polymer that is formed through chemical oxidation polymerization of a polymerizing monomer in a solution containing at least a non-transition metal-based oxidizing agent and an organic acid compound.

The capacitor device may be infiltrated with a driving electrolytic solution to construct the electrolytic capacitor.

The electrolytic capacitor of the invention comprises a capacitor device that is constructed by coiling up a dielectric oxide film-having anode foil and a cathode foil put opposite to each other via a separator coated with an electroconductive polymer formed through chemical oxidation polymerization of a polymerizing monomer in a solution containing at least a non-transition metal-based oxidizing agent and an organic acid compound. Having the constitution, the advantages of the electrolytic capacitor are as follows: (1) The electrolytic polymer formed through chemical oxidation polymerization by the use of a non-transition metal-based oxidizing agent does not contain a transition metal ion such as iron or copper that readily undergoes oxidation-reduction, and no transition metal ion exists inside the capacitor. Therefore, even when a large amount of water penetrates into the inside of the capacitor in a high-humidity atmosphere, the capacitor is free from the problem of leak current that increases through dissolution and deposition of transition metal ions. (2) Since the chemical oxidation polymerization is attained in the presence of an organic acid compound, a hardly-dedopable organic acid component having a large molecular weight may be doped into the electroconductive polymer. Accordingly, the electroconductive polymer of good heat resistance can be formed on the separator fibers, and even when a large amount of water penetrates into the inside of the capacitor in a high-humidity atmosphere, the organic acid component hardly dedopes into water.

As a result, the invention provides a low-ESR electrolytic capacitor that has the advantages of high voltage-proofness and good stability in leak current.

When the capacitor device is infiltrated with a driving electrolytic solution, then the defects of the dielectric oxide film of the anode foil may be repaired, and therefore, the electrolytic capacitor having the constitution may have further higher voltage-proofness and better stability in leak current.

DESCRIPTION OF THE PREFERRED EMBODIMENTS

Figure 1:
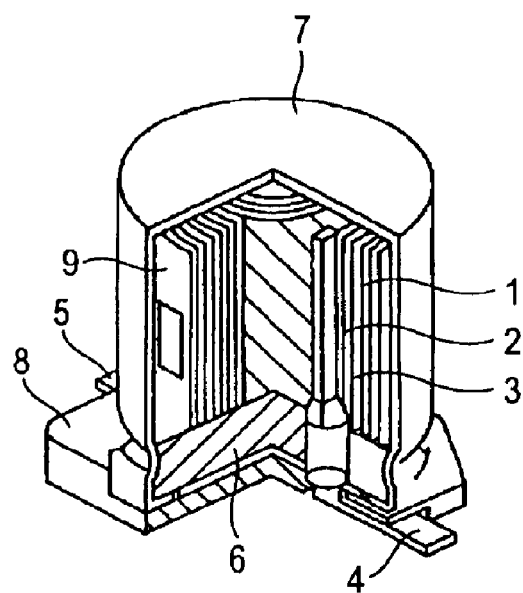
FIG. 1 is partly-cut perspective view that shows the constitution of one embodiment of the electrolytic capacitor of the invention.

Embodiments of the invention are described hereinunder with reference to the drawing attached hereto.

FIG. 1 is a partly-cut perspective view that shows the constitution of the electrolytic capacitor of the invention. In this, the anode foil 1 is formed of an aluminium foil that that has been surface-roughened through etching treatment and then processed for anodic oxidation to form a dielectric oxide film thereon; the cathode foil 2 is formed of an aluminium foil that has been subjected to at least etching treatment; and the separator 3 is coated with an electroconductive polymer formed through chemical oxidation polymerization of a polymerizing monomer in a solution that contains at least a non-transition metal-based oxidizing agent and an organic acid compound. The separator 3 is sandwiched between the anode foil 1 and the cathode foil 2, and they are coiled up to construct the capacitor device 9.

The capacitor device 9 is cased in a bottomed cylindrical aluminium case 7, and the opening of the aluminium case 7 is sealed with a sealant member 6, through which an anode lead 4 and a cathode lead 5 are led out from the anode foil 1 and the cathode foil 2, respectively, for external connection. An insulation seat 8 is disposed below the sealant member 6 to construct a face-mounting electrolytic capacitor.

The capacitor device 9 may be infiltrated with a driving electrolytic solution before it is sealed up. FIG. 1 shows the face-mounting electrolytic capacitor. However, the invention is not limited to such a face-mounting structure. In the electrolytic capacitor of the invention, the insulation seat 8 may be omitted.

The non-transition metal-based oxidizing agent includes, for example, ammonium persulfate, potassium persulfate, sodium persulfate, hydrogen peroxide, sodium hypochlorite.

The organic acid compound includes, for example, benzenesulfonic acid, naphthalenesulfonic acid, toluenesulfonic acid, nitrophenol.

The separator is formed of a separator substrate of non-woven fabric that contains at lest one or more selected from a group of polyethylene terephthalate, polybutylene terephthalate, polyphenylene sulfide, nylon, aromatic polyamide, polyimide, polyamidaimide, polyether imide, rayon and glassy material. The separator substrate of non-woven fabric well adheres to a solid electrolyte of an electroconductive polymer that is formed through chemical oxidation, such as polypyrrole and poly-3,4-ethylenedioxy-thiophene, and it may further lower the ESR of the capacitor in a high-frequency region.

Different from other nonwoven fabrics formed of any other synthetic resin material, the separator substrate of nonwoven fabric mentioned above may be readily formed into sheets in a thermal bonding method or a mechanical entangling method not using an adhesive for bonding fibers to give sheets. In addition, since the separator substrate of the type has a high melting point, it is free from troubles of separator fiber breakage or ESR increase that may be caused by thermal shrinkage of resin, even under soldering and parts-mounting conditions at higher than 250° C. Accordingly, the invention gives low-ESR electrolytic capacitors of good soldering heat resistance.

Of various nonwoven fabrics, those that contain at least one of polyethylene terephthalate, polybutylene terephthalate, nylon, aromatic polyamide, polyimide and polyamidimide and are prepared in a spun-bonding process or a wet-papermaking process are preferable, as compared with any others prepared in a dry melt-blowing process, since they have a high tensile strength and since the separator breakage frequency in coiling up to construct capacitor devices with them is lower when they are compared with any others having the same thickness and the same weight, and therefore the frequency of short circuit in the capacitors with them is reduced.

The thickness of the separator substrate of nonwoven fabric is preferably at most 100 μm, and the weight thereof is preferably from 10 to 60 g/m². Falling within the range, the separator ensures a good tensile strength enough to withstand separator breakage in coiling it up to construct capacitor devices. Accordingly, even the capacitor devices having a small diameter may have a large capacity per the unit volume, and the resistance between the anode foil and the cathode foil may be reduced. As a result, the electrolytic capacitors thus constructed may have a reduced ESR in a high-frequency region.

If the weight of the separator substrate is smaller than 10 g/m², it is unfavorable since the frequency of separator breakage in coiling it up increases; and if it is larger than 60 g/m², it is also unfavorable since ESR of the capacitors in a high-frequency region increases.

When the separator substrate is dipped in the solution for forming an electroconductive polymer through chemical oxidation polymerization around it, then the entangled fibers constituting it are relaxed and, as a result, the thickness of the separator may be larger than the original thickness of the non-processed separator. Preferably, therefore, the thickness increment is taken into consideration, and the original thickness of the separator substrate is more preferably at most 70 μm.

The nonwoven fabric for the separator substrate may contain cellulose fibers such as Manila hemp or kraft fibers, but it is desirable that the cellulose fiber content of the mixed nonwoven fabric is at most 80%. If the cellulose fiber content is larger than 80%, the adhesiveness of the separator substrate will be poor and, if so, ESR of the capacitors in a high-frequency region will increase.

Concrete examples of the invention are described below.

EXAMPLE 1

A separator substrate (having a thickness of 50 μm and a weight of 25 g/m²) of a nonwoven fabric that had been prepared from a starting material, aromatic polyamide resin of essentially polyparaphenylene-terephthalamide in a spun-bonding method was dipped in an aqueous solution containing pyrrole (concentration, 0.5% by weight), ammonium persulfate (concentration, 3% by weight), and an organic acid compound, 1-naphthalenesulfonic acid (concentration, 5% by weight) (the solution is hereinafter referred to as polymerization solution A) and then pulled up, whereby an electroconductive polymer, polypyrrole was formed around its surface through chemical oxidation polymerization assisted by the oxidation action of ammonium persulfate. The separator substrate thus coated with polypyrrole was washed with water and then dried at 70° C. This operation was repeated three times to obtain a separator (this is hereinafter referred to as separator A).

The electroconductivity of the separator A was measured according to a 4-terminal method (with a tester, Mitsubishi Chemical's Loresta), and was 1.1 S/cm.

To confirm the polymerization, a 1-cm² sample of the separator A was cut into pieces, dipped in 10 ml of pure water, and ultrasonically processed for 30 minutes. The iron concentration in the resulting filtrate was quantified through atomic absorptiometry, but no iron was detected therein. In addition, the anion component in the filtrate was qualified through ion chromatography, and a sulfate ion (derived from ammonium persulfate) and a 1-naphthalenesulfonate ion were detected.

The results confirm the release of the organic acid ion, 1-naphthalenesulfonate ion through the ultrasonic treatment, therefore confirming that the organic acid ion, 1-naphthalenesulfonate ion was doped in the electroconductive polymer, polypyrrole through the repeated treatment of dipping, washing with water and drying the separator substrate.

Next, an aluminium foil was etched to roughen its surface, and then subjected to anodic oxidation to form a dielectric oxide film (formation voltage, 38 V) thereon. Thus processed, this serves as an anode foil. On the other hand, another aluminium foil was etched to be a cathode foil. These were coiled up with the separator A put therebetween to construct a capacitor device.

The capacitor device had a capacitance of 100 μF, measured in an ethylene glycol solution of 10 wt. % ammonium adipate, at a frequency of 120 Hz.

Next, the capacitor device was dipped in a γ-butyrolactone solution containing mono(triethylamine) phthalate (concentration, 25% by weight), p-nitrobenzoic acid (concentration, 0.5% by weight) and monobutyl phosphate (concentration, 0.5% by weight) (this is hereinafter referred to as driving electrolytic solution A), under a reduced pressure (60 mmHg) to thereby make the voids of the capacitor device infiltrated with the driving electrolytic solution A.

Next, the capacitor device was inserted into a bottomed cylindrical aluminium case, and the opening of the case was sealed up with a sealant of resin-vulcanized butyl rubber (this is composed of 30 parts of butyl rubber polymer, 20 parts of carbon and 50 parts of inorganic filler, and the sealant hardness is 70 IRHD (International Rubber Hardness Degrees)) in a mode of curling with it. Further, both leads from the anode foil and the cathode foil were led through an insulation seat formed of polyphenylene sulfide, and their ends were flattened and folded to fix the insulation seat.

Finally, the capacitor device was aged by continuously applying thereto a direct current voltage of 35 V for 1 hour at an ambient temperature of 105° C. The process gave a face-mounting electrolytic capacitor (size, 10 mm diameter×8 mm height).

EXAMPLE 2

An electrolytic capacitor was constructed in the same manner as in Example 1, except for the following: The polymerization solution A was not used. The separator substrate was first dipped in an ethanol solution of pyrrole (concentration, 0.5% by weight) and then in an aqueous solution containing ammonium persulfate (concentration, 3% by weight) and an organic acid compound, 1-naphthalenesulfonic acid (concentration, 5% by weight), and then pulled up, whereby an electroconductive polymer, polypyrrole was formed around its surface through chemical oxidation polymerization assisted by the oxidation action of ammonium persulfate. The separator substrate thus coated with polypyrrole was washed with water and then dried at 70° C. This operation was repeated five times to obtain a separator (this is hereinafter referred to as separator B).

The electroconductivity of the separator B was measured according to a 4-terminal method (with a tester, Mitsubishi Chemical's Loresta), and was 1.6 S/cm.

To confirm the polymerization, a 1-cm² sample of the separator B was cut into pieces, dipped in 10 ml of pure water, and ultrasonically processed for 30 minutes. The iron concentration in the resulting filtrate was quantified through atomic absorptiometry, but no iron was detected therein. In addition, the anion component in the filtrate was qualified through ion chromatography, and a sulfate ion (derived from ammonium persulfate) and a 1-naphthalenesulfonate ion were detected. The results confirm the release of the organic acid ion, 1-naphthalenesulfonate ion through the ultrasonic treatment, therefore confirming that the organic acid ion, 1-naphthalenesulfonate ion was doped in the electroconductive polymer, polypyrrole through the repeated treatment of dipping, washing with water and drying the separator substrate.

EXAMPLE 3

An electrolytic capacitor was constructed in the same manner as in Example 1, for which, however, the separator substrate was formed of a nonwoven fabric that had been prepared from a fiber mixture consisting essentially of polyethylene terephthalate-based polyester fibers with a comonomer, 3,5-dicarbomethoxybenzenesulfonic acid and polyethylene terephthalate-based polyester fibers with a comonomer of diethylene glycol, in a bi-component wet-papermaking process. The substrate had a thickness of 50 μm and a weight of 22 g/m$^2$, and the separator prepared with it is referred to as separator C.

The electroconductivity of the separator C was measured according to a 4-terminal method (with a tester, Mitsubishi Chemical's Loresta), and was 3.2 S/cm.

To confirm the polymerization, a 1-cm$^2$ sample of the separator C was cut into pieces, dipped in 10 ml of pure water, and ultrasonically processed for 30 minutes. The iron concentration in the resulting filtrate was quantified through atomic absorptiometry, but no iron was detected therein. In addition, the anion component in the filtrate was qualified through ion chromatography, and a sulfate ion (derived from ammonium persulfate) and a 1-naphthalenesulfonate ion were detected. The results confirm that the organic acid ion, 1-naphthalenesulfonate ion was doped in the electroconductive polymer, polypyrrole.

EXAMPLE 4

An electrolytic capacitor was constructed in the same manner as in Example 1, for which, however, a γ-butyrolactone solution containing mono(1,2,3,4-tetramethylimidazolium) phthalate (concentration, 30% by weight), p-nitrobenzoic acid (concentration, 0.5% by weight) and monobutyl phosphate (concentration, 0.5% by weight) (this is hereinafter referred to as driving electrolytic solution B) was used in place of the driving electrolytic solution A.

EXAMPLE 5

An electrolytic capacitor was constructed in the same manner as in Example 1, for which, however, a mixture solution of 80 parts of γ-butyrolactone and 20 parts of ethylene glycol that contains mono (ethyldimethylmethylamine) phthalate (concentration, 26% by weight), p-nitrophenol (concentration, 0.5% by weight), monobutyl phosphate (concentration, 0.5% by weight), hypophosphorous acid (concentration, 0.1% by weight), boric acid (concentration, 0.2% by weight) and mannitol (concentration, 0.2% by weight) (this is hereinafter referred to as driving electrolytic solution C) was used in place of the driving electrolytic solution A.

EXAMPLE 6

An electrolytic capacitor was constructed in the same manner as in Example 1, except for the following: In place of the polymerization solution A, herein used was an aqueous solution that contains pyrrole (concentration, 0.5% by weight), potassium persulfate (concentration, 3% by weight), aqueous hydrogen peroxide (concentration, 5% by weight), an organic acid compound, p-toluenesulfonic acid (concentration, 5% by weight) and p-nitrophenol (concentration, 0.1% by weight) (this is hereinafter referred to as polymerization solution B). The operation of dipping, washing with water and drying was repeated 5 times, and the separator thus prepared herein is referred to as separator D.

The electroconductivity of the separator D was measured according to a 4-terminal method (with a tester, Mitsubishi Chemical's Loresta), and was 3.0 S/cm.

To confirm the polymerization, a 1-cm$^2$ sample of the separator D was cut into pieces, dipped in 10 ml of pure water, and ultrasonically processed for 30 minutes. The iron concentration in the resulting filtrate was quantified through atomic absorptiometry, but no iron was detected therein. In addition, the anion component in the filtrate was qualified through ion chromatography, and a sulfate ion (derived from potassium persulfate) and a p-toluenesulfonate ion were detected. The results confirm that the organic acid ion, p-toluenesulfonate ion was doped in the electroconductive polymer, polypyrrole.

EXAMPLE 7

An electrolytic capacitor was constructed in the same manner as in Example 1, except for the following: In place of the polymerization solution A, herein used was an aqueous solution that contains 3,4-ethylenedioxy-thiophene (concentration, 0.3% by weight), sodium hypochlorite (concentration, 1% by weight), sodium persulfate (concentration, 3% by weight), an organic acid compound, 2-naphthalenesulfonic acid (concentration, 5% by weight), p-nitrophenol (concentration, 0.1% by weight) and ethyl alcohol (concentration, 10% by weight) (this is hereinafter referred to as polymerization solution C). The operation of dipping, washing with water and drying was repeated 5 times, and the separator thus prepared herein is referred to as separator E.

The electroconductivity of the separator E was measured according to a 4-terminal method (with a tester, Mitsubishi Chemical's Loresta), and was 3.5 S/cm.

To confirm the polymerization, a 1-cm$^2$ sample of the separator E was cut into pieces, dipped in 10 ml of pure water, and ultrasonically processed for 30 minutes. The iron concentration in the resulting filtrate was quantified through atomic absorptiometry, but no iron was detected therein. In addition, the anion component in the filtrate was qualified through ion chromatography, and a sulfate ion (derived from sodium persulfate) and a 2-naphthalenesulfonate ion were detected. The results confirm that the organic acid ion, 2-naphthalenesulfonate ion was doped in the electroconductive polymer, poly-3,4-ethylenedioxy-thiophene.

EXAMPLE 8

An electrolytic capacitor was constructed in the same manner as in Example 1, for which, however, the driving electrolytic solution was not infiltrated into the capacitor device.

Comparative Example 1

An electrolytic capacitor was constructed in the same manner as in Example 1, except for the following: The polymerization solution A was not used. The separator substrate was dipped in an aqueous solution that contains pyrrole (concentration, 0.5% by weight), a transition metal salt of organic acid, ferric 1-naphthalenesulfonate (concentration, 5% by weight) and p-nitrophenol (concentration, 0.1% by weight) (this is hereinafter referred to as polymerization solution D), and then pulled up, whereby an electroconductive polymer, polypyrrole was formed around its surface through chemical oxidation polymerization assisted by the oxidation action of the trivalent iron ion. The separator substrate thus coated with polypyrrole was washed with water and then dried at 70° C. This operation was repeated three times to obtain a separator (this is hereinafter referred to as separator F).

The electroconductivity of the separator F was measured according to a 4-terminal method (with a tester, Mitsubishi Chemical's Loresta), and was 1.0 S/cm.

To confirm the polymerization, a 1-cm$^2$ sample of the separator F was cut into pieces, dipped in 10 ml of pure water, and ultrasonically processed for 30 minutes. The iron concentration in the resulting filtrate was quantified through atomic absorptiometry, and 320 ppm of iron was detected. In addition, the anion component in the filtrate was qualified through ion chromatography, and a sulfate ion (derived from ammonium persulfate) and a 1-naphthalenesulfonate ion were detected. The results confirm that the organic acid ion, 1-naphthalenesulfonate ion was doped in the electroconductive polymer, polypyrrole.

Comparative Example 2

An electrolytic capacitor was constructed in the same manner as in Example 1, except for the following: The polymerization solution A was not used. The separator substrate was dipped in an aqueous solution that contains pyrrole (concentration, 0.5% by weight), ammonium persulfate (concentration, 3% by weight) and an inorganic acid, sulfuric acid (concentration 5% by weight) (this is hereinafter referred to as polymerization solution E), and then pulled up, whereby an electroconductive polymer, polypyrrole was formed around its surface through chemical oxidation polymerization assisted by the oxidation action of ammonium persulfate. The separator substrate thus coated with polypyrrole was washed with water and then dried at 70° C. This operation was repeated three times to obtain a separator (this is hereinafter referred to as separator G).

The electroconductivity of the separator G was measured according to a 4-terminal method (with a tester, Mitsubishi Chemical's Loresta), and was 1.0 S/cm.

To confirm the polymerization, a 1-cm$^2$ sample of the separator G was cut into pieces, dipped in 10 ml of pure water, and ultrasonically processed for 30 minutes. The iron concentration in the resulting filtrate was quantified through atomic absorptiometry, but no iron was detected. In addition, the anion component in the filtrate was qualified through ion chromatography, and any other anions than sulfate ions (derived from ammonium persulfate and sulfuric acid) were not detected. The results confirm that any other component than the inorganic acid, sulfuric acid was not doped in the electroconductive polymer, polypyrrole.

Comparative Example 3

An electrolytic capacitor was constructed in the same manner as in Example 1, for which, however, the separator substrate used was comprised of 100% Manila hemp fibers (having a thickness of 50 μm and a weight of 20 gm$^2$) (this is hereinafter referred to as separator H).

The electroconductivity of the separator H was measured according to a 4-terminal method (with a tester, Mitsubishi Chemical's Loresta), and it was 0.12 S/cm and was low. In addition, the mechanical strength of the separator was also low.

Comparative Example 4

An electrolytic capacitor was constructed in the same manner as in Example 1, for which, however, the separator substrate was not coated with an electroconductive polymer.

Comparative Example 5

An aluminium foil was etched to roughen its surface, and then subjected to anodic oxidation to form a dielectric oxide film (formation voltage, 38 V) thereon. Thus processed, this serves as an anode foil. On the other hand, another aluminium foil was etched to be a cathode foil. These were coiled up with a separator put therebetween to construct a capacitor device. The separator was formed of a nonwoven fabric that had been prepared from an aromatic aramid resin consisting essentially of polyparaphenyleneterephthalamide, according to a spun-bonding process. Its thickness was 50 μm and its weight was 25 g/m$^2$.

The capacitor device had a capacitance of 110 μF measured in an ethylene glycol solution of 10 wt. % ammonium adipate, at a frequency of 120 Hz.

Next, the capacitor device was dipped in a polymerization solution that comprises 1 part of a heterocyclic polymerizing monomer, 3,4-ethylenedioxy-thiophene, 2 parts of an oxidizing agent, ferric p-toluenesulfonate, and 4 parts of a polymerization solvent, n-butanol, and then pulled up. With that, this was kept heated at 85° C. for 60 minutes to undergo chemical oxidation polymerization to form an electroconductive polymer, poly-3,4-ethylenedioxy-thiophene between the electrode foils.

Next, the capacitor device was inserted into a bottomed cylindrical aluminium case, and the opening of the case was sealed up with a sealant of resin-vulcanized butyl rubber (this is composed of 30 parts of butyl rubber polymer, 20 parts of carbon and 50 parts of inorganic filler, and the sealant hardness is 70 IRHD (International Rubber Hardness Degrees)) in a mode of curling with it. Further, both leads from the anode foil and the cathode foil were led through an insulation seat formed of polyphenylene sulfide, and their ends were flattened and folded to complete a face-mounting electrolytic capacitor.

Finally, the capacitor device was aged by continuously applying thereto a direct current voltage of 35 V for 1 hour at an ambient temperature of 105° C. However, all the tested samples (100 samples in all) of the electrolytic capacitor short-circuited. Electrolytic capacitors having normal electric properties could not be obtained.

The electrolytic capacitors thus fabricated in Examples 1 to 8 of the invention and in Comparative Examples 1 to 5 were tested to measure their capacitance (measured at a frequency of 120 Hz), ESR (measured at a frequency of 100 kHz), leak current (measured in 2 minutes after application of a rated voltage of 30 V), and frequency of short circuits (failures) during aging. In addition, after the samples were tested for exposure to a rated voltage of 30 V for 500 hours at an ambient temperature of 125° C., their ESR and leak current were measured and compared with each other. The results are given in Table 1. The number of the samples of each capacitor tested was 100. The data of capacitance, ESR, leak current, as well as ESR and leak current after the rated voltage application test are in terms of the average of the tested samples except the failed samples.

TABLE 1

| | Electric Data after aging (initial data) | | | Data after test at 125° C. for 500 hrs | |
|---|---|---|---|---|---|
| | Capacitance ($\mu$F) | ESR (M$\Omega$) | Leak Current ($\mu$A) | Number of Failures in aging | ESR (M$\Omega$) | Leak Current ($\mu$A) |
| Example 1 | 100 | 21 | <1 | 0 | 24 | <1 |
| Example 2 | 100 | 19 | <1 | 0 | 21 | <1 |
| Example 3 | 101 | 20 | <1 | 0 | 22 | <1 |
| Example 4 | 99 | 19 | <1 | 0 | 22 | <1 |
| Example 5 | 99 | 18 | <1 | 0 | 20 | <1 |
| Example 6 | 99 | 18 | <1 | 0 | 18 | <1 |
| Example 7 | 99 | 18 | <1 | 0 | 18 | <1 |
| Example 8 | 97 | 25 | <1 | 0 | 55 | <1 |
| Comparative Example 1 | 99 | 20 | 24 | 12 | 24 | 109 (11 samples short-circuited during the test) |
| Comparative Example 2 | 100 | 20 | <1 | 0 | 201 | <1 |
| Comparative Example 3 | 100 | 203 | <1 | 0 | 307 | <1 |
| Comparative Example 4 | 98 | 820 | <1 | 0 | 850 | <1 |
| Comparative Example 5 | impossible to measure | | | all short-circuited | impossible to test | |

Table 1 confirms the following: In the electrolytic capacitors of Examples 1 to 8 of the invention, the surface of the separator substrate is coated with an electroconductive polymer that is formed through chemical oxidation polymerization of a polymerizing monomer in a solution containing at least a non-transition metal-based oxidizing agent and an organic acid compound (therefore; the separator has a conductivity of from 1.1 to 3.5 S/cm). Accordingly, as compared with the electrolytic capacitor of Comparative Example 4, in which the separator is not coated with an electroconductive polymer (conductivity of driving electrolytic solution, 5 mS/cm), the resistance between the electrodes in the electrolytic capacitors of the invention may be reduced and the ESR of the capacitors in a high-frequency region may be lowered.

When compared with the electrolytic capacitor of Comparative Example 1, in which the separator F used is coated with an electroconductive polymer formed by the use of a transition metal-based iron salt-type oxidizing agent (iron residue content, 320 ppm), the electrolytic capacitors of the invention are free from the troubles of leak current increase that may be caused by transition metal dissolution and deposition and free from short circuits during aging, even in a driving atmosphere that contains a driving electrolytic solution. As a result, the electrolytic capacitors of the invention have the advantages of high voltage-proofness and good stability in leak current.

When compared with the electrolytic capacitor of Comparative Example 2, in which the separator G is coated with an electroconductive polymer formed by the use of an inorganic acid, ammonium persulfate and sulfuric acid serving as a dopant component (in this, the inorganic acid alone was doped into the separator), the electrolytic capacitors of the invention are hardly dedoped and the conductivity of the electroconductive polymer in them is therefore hardly lowered. As a result, even after the test at 125° C. for 500 hours, the ESR change in the capacitors of the invention is small, and the reliability of the face-mounting capacitors of the invention is high.

The separators G and A used in Comparative Example 2 and Example 1 were tested alone by heating them in a nitrogen atmosphere at 125° C. for 100 hours, and the conductivity reduction in these was measured. Since the separator G in Comparative Example 2 was dedoped, its conductivity reduction was −60% relative to the original conductivity. However, since the separator A was hardly dedoped, its conductivity reduction was only −5%. This confirms good heat resistance of the electroconductive polymer formed around the separator A.

In the electrolytic capacitors of Examples 1 to 8 of the invention, a nonwoven fabric of polyethylene terephthalate or aromatic polyamide is used as the separator substrate and this is coated with an electroconductive polymer, polypyrrole or poly-3,4-ethylenedioxy-thiophene formed thereon through chemical oxidation polymerization. In these, the polymer firmly adheres to the fibers that constitute the separator substrate. Accordingly, when compared with the electrolytic capacitor of Comparative Example 3 in which the separator is formed of 100% Manila hemp fibers (conductivity of separator, 0.12 S/cm), the resistance between the electrodes in the capacitors of the invention may be reduced, and therefore the capacitors may have a reduced ESR in a high-frequency region. Moreover, the capacitors of the invention are free from a trouble of peeling of the electroconductive polymer from the separator substrate. As a result, even after the test at 125° C. for 500 hours, the ESR change in the capacitors of the invention is small, and the reliability of the face-mounting capacitors of the invention is high.

Moreover, in the electrolytic capacitors of Examples 1 to 8 of the invention, the surface of the separator is coated with an electroconductive polymer formed through chemical oxidation polymerization. In addition, the capacitors contain a driving electrolytic solution and the dielectric oxide film is well repaired. Accordingly, when compared with the capacitor of Comparative Example 5 in which only the electroconductive polymer is used and its ability to repair a dielectric oxide film is poor, the electrolytic capacitors of the invention are free from the trouble of leak current increase that may be caused by poor voltage-proofness and free from short circuits during aging. The capacitors of the invention have the advantages of high voltage-proofness and good stability in leak current.

When the separator substrate is coated with an electroconductive polymer, poly-3,4-ethylenedioxy-thiophene (Example 7), the electroconductive polymer hardly undergoes oxidation deterioration to cut polymer chains therein. Accordingly, the conductivity reduction in the capacitor is small, and, as a result, the ESR change therein in a high-frequency region after reflow treatment or high-temperature test is much reduced. The reliability of the face-mounting electrolytic capacitor of the invention is further enhanced.

The invention provides a low-ESR high-performance electrolytic capacitor which is usable in high-frequency circuits in electronic appliances.

What is claimed is:

1. An electrolytic capacitor with a capacitor device, comprising:

a separator, coated with an electroconductive polymer that is formed through chemical oxidation polymerization of a polymerizing monomer in a solution containing at least a non-transition metal-based oxidizing agent and an organic acid compound;

an anode foil, having a dielectric oxide film; and an cathode foil, opposed to the anode foil;

wherein the anode foil and the cathode foil are coiled up via the separator sandwiched between the anode foil and the cathode foil.

2. The electrolytic capacitor as claimed in claim 1, wherein the separator is constituted by a nonwoven fabric that contains at least one or more selected from a group of polyethylene terephthalate, polybutylene terephthalate, polyphenylene sulfide, nylon, aromatic polyamide, polyimide, polyamidaimide, polyether imide, rayon and glassy material.

3. The electrolytic capacitor according to claim 2, wherein the nonwoven fabric is prepared in a spun-bonding process or a wet-papermaking process.

4. The electrolytic capacitor according to claim 2, wherein the thickness of the separator substrate is at most 100 $\mu$m, and the weight thereof is from 10 to 60 $g/m^2$.

5. The electrolytic capacitor according to claim 1, wherein the capacitor device is infiltrated with a driving electrolytic solution.

* * * * *